US012116825B2

(12) United States Patent
Gireesha et al.

(10) Patent No.: US 12,116,825 B2
(45) Date of Patent: Oct. 15, 2024

(54) ADJUSTMENT SCREW INDICATOR MECHANISM

(71) Applicant: Schlage Lock Company LLC, Carmel, IN (US)

(72) Inventors: Benaka Gireesha, Udupi (IN); Ankith Kulal, Mangalore (IN); Vidyashree D. Shenoy, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 121 days.

(21) Appl. No.: 17/719,577

(22) Filed: Apr. 13, 2022

(65) Prior Publication Data

US 2023/0332450 A1 Oct. 19, 2023

(51) Int. Cl.
*E05F 3/04* (2006.01)
*E05F 3/10* (2006.01)

(52) U.S. Cl.
CPC .................................... *E05F 3/10* (2013.01)

(58) Field of Classification Search
CPC . E05F 1/1025; E05F 1/04; E05F 1/105; E05F 1/1041; E05F 1/1008; E05F 3/10; E05F 3/12; E05F 3/104; E05F 3/102; E05F 3/22; E05F 3/221; E05F 3/223; E05F 3/227; E05Y 2201/212; E05Y 2201/25; E05Y 2201/256; E05Y 2201/618; E05Y 2201/716; E05Y 2201/722; E05Y 2201/11; E05Y 2201/474; E05Y 2201/492; E05Y 2900/132; E05Y 2400/818; E05Y 2201/41; E05Y 2600/45; E05Y 2600/46; Y10T 16/577; Y10T 16/2804; Y10T 16/285; Y10T 16/293; Y10T 16/585; Y10T 16/299; Y10T 16/286; Y10T 16/27
See application file for complete search history.

(56) References Cited

U.S. PATENT DOCUMENTS 2,767,681 A * 10/1956 Pontius .............. F16K 37/0016
137/553
2,881,646 A 4/1959 Farr et al.
(Continued)

FOREIGN PATENT DOCUMENTS

CA 2840214 C 3/2018
DE 102011077990 A1 * 12/2012 ............. E05F 3/104
(Continued)

OTHER PUBLICATIONS

Allegion; LCN 4000 Series Surface Mounted Closers; Rev. Apr. 2020; 76 pages; Copyright 2020 Allegion.

*Primary Examiner* — Chuck Y Mah
(74) *Attorney, Agent, or Firm* — Taft Stettinius & Hollister LLP

(57) ABSTRACT

An exemplary door operator comprises a body, a hydraulic regulation valve, and a visual indicator mechanism. The hydraulic regulation valve is mounted to the body and is operable to adjust an operating characteristic of the door operator. The hydraulic regulation valve includes an adjustment screw having a variable screw position. The visual indicator mechanism is engaged with the hydraulic regulation valve, and is configured provide a visual indication relating to a level of regulation provided by the hydraulic regulation valve. The visual indication varies according to the variable screw position.

15 Claims, 11 Drawing Sheets

(56) References Cited

U.S. PATENT DOCUMENTS

| | | | | | |
|---|---|---|---|---|---|
| 3,337,902 | A | | 8/1967 | Webb et al. | |
| 4,195,552 | A | * | 4/1980 | Neff | F15B 13/02 91/443 |
| 4,381,797 | A | * | 5/1983 | Neff | F15B 13/02 251/266 |
| 4,590,639 | A | * | 5/1986 | Fritsche | E05F 3/10 16/DIG. 39 |
| 4,665,583 | A | | 5/1987 | Frolov et al. | |
| 4,783,882 | A | * | 11/1988 | Frolov | E05F 3/22 16/72 |
| 5,251,400 | A | * | 10/1993 | Schultze | E05F 15/53 49/32 |
| 5,272,787 | A | * | 12/1993 | Salena | E05F 3/102 16/56 |
| 6,052,929 | A | * | 4/2000 | Canadas | G09F 3/00 40/594 |
| 6,112,368 | A | | 9/2000 | Luckett | |
| 6,205,615 | B1 | | 3/2001 | Jensen et al. | |
| 6,282,750 | B1 | * | 9/2001 | Bishop | E05F 3/102 16/72 |
| 9,278,031 | B2 | * | 3/2016 | Brown | A61F 11/08 |
| 10,815,712 | B2 | * | 10/2020 | Toloday | E05F 3/12 |
| 10,858,872 | B2 | * | 12/2020 | Barbon | E05F 3/227 |
| 10,961,760 | B2 | | 3/2021 | Shetty et al. | |
| 2011/0191981 | A1 | * | 8/2011 | Bell | E05F 3/102 16/72 |
| 2017/0265586 | A1 | * | 9/2017 | Schneider | H02P 7/03 |
| 2019/0249784 | A1 | * | 8/2019 | Komatsuzaki | F16K 15/1826 |
| 2020/0173214 | A1 | * | 6/2020 | Chin | E05F 3/104 |
| 2020/0347657 | A1 | | 11/2020 | Fickhoff et al. | |

FOREIGN PATENT DOCUMENTS

| | | | | | |
|---|---|---|---|---|---|
| EP | 0292743 | A1 | * | 11/1988 | |
| WO | WO-2015066265 | A1 | * | 5/2015 | E05F 3/00 |

* cited by examiner

ADJUSTMENT SCREW INDICATOR MECHANISM

TECHNICAL FIELD

The present disclosure generally relates to door operators, and more particularly but not exclusively relates to indicator mechanisms for hydraulic door operators.

BACKGROUND

Door closers are commonly installed to swinging doors to bias the door towards a closed position. Many such door closers include a piston that reciprocates within a body, which is filled with a hydraulic fluid that resists the movement of the piston. The body defines a flow passage through which the hydraulic fluid flows as the piston reciprocates, and an adjustable regulation valve controls the rate of fluid flow through the passage to modulate the speed of the piston. The valve typically includes a screw that extends into a cavity formed in the body, and which can be rotated in opposite directions to advance further into the cavity and withdraw from the cavity. However, it has been found that certain closers of this type suffer from drawbacks and limitations, such as those related to ease of adjustment. As one example, if the adjustment screw is backed out too far, the hydraulic fluid may begin to leak from the passage, thereby causing the closer to fail. As another example, it may be difficult to determine the position of the screw, and thus the regulation speed being provided by the valve. For these reasons among others, there remains a need for further improvements in this technological field.

SUMMARY

An exemplary door operator comprises a body, a hydraulic regulation valve, and a visual indicator mechanism. The hydraulic regulation valve is mounted to the body and is operable to adjust an operating characteristic of the door operator. The hydraulic regulation valve includes an adjustment screw having a variable screw position. The visual indicator mechanism is engaged with the hydraulic regulation valve, and is configured provide a visual indication relating to a level of regulation provided by the hydraulic regulation valve. The visual indication varies according to the variable screw position. Further embodiments, forms, features, and aspects of the present application shall become apparent from the description and figures provided herewith.

DETAILED DESCRIPTION OF ILLUSTRATIVE EMBODIMENTS

Figure 1:
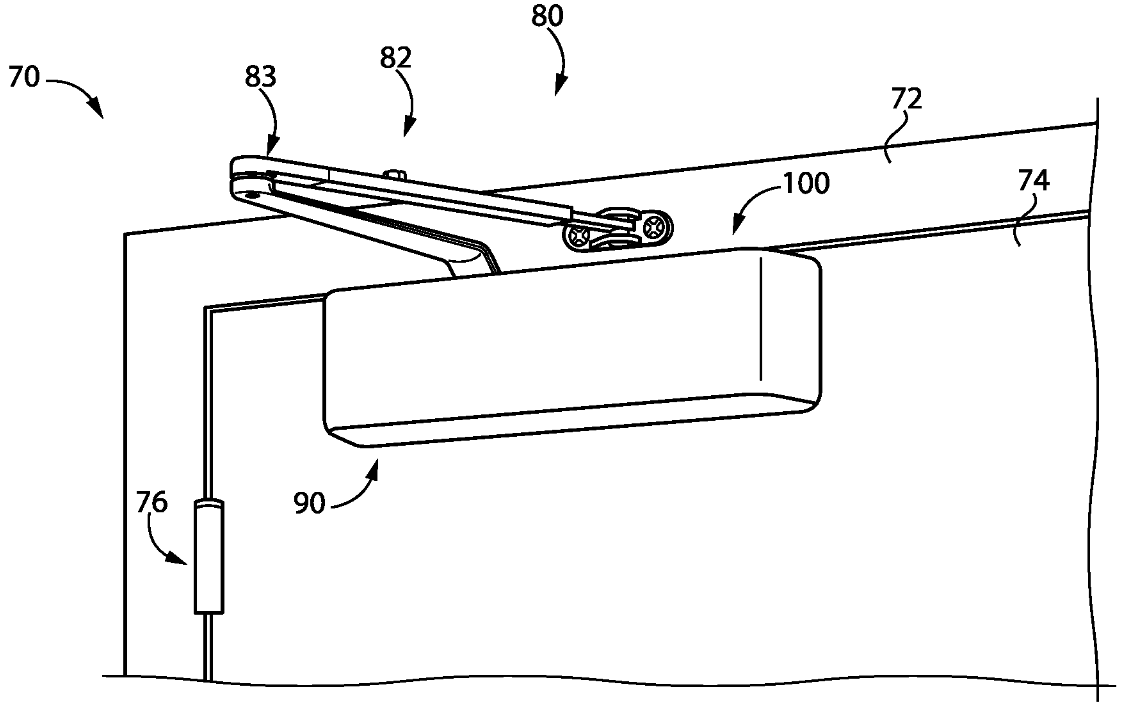
FIG. 1 is a perspective view of a closure assembly according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of “at least one of A, B, and C” can mean (A); (B); (C); (A and B); (B and C); (A and C); or (A, B, and C). Similarly, items listed in the form of “at least one of A, B, or C” can mean (A); (B); (C); (A and B); (B and C); (A and C); or (A, B, and C). Items listed in the form of “A, B, and/or C” can also mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a closure assembly 70 according to certain embodiments. The closure assembly 70 generally includes a doorframe 72, a door 74 pivotably mounted to the doorframe 72, and a door operator assembly 80 according to certain embodiments. The door 74 is pivotably mounted to the doorframe 72 via one or more hinges 76, and is operable to swing between an open position and a closed position. The operator assembly 80 generally includes an armature 82, a housing assembly 90, and a door operator 100 according to certain embodiments. As described herein, the door operator 100 is configured to facilitate movement of the door 74 between the open position and the closed position, and the housing assembly 90 is configured to conceal at least a portion of the operator 100 from view.

Figure 2:
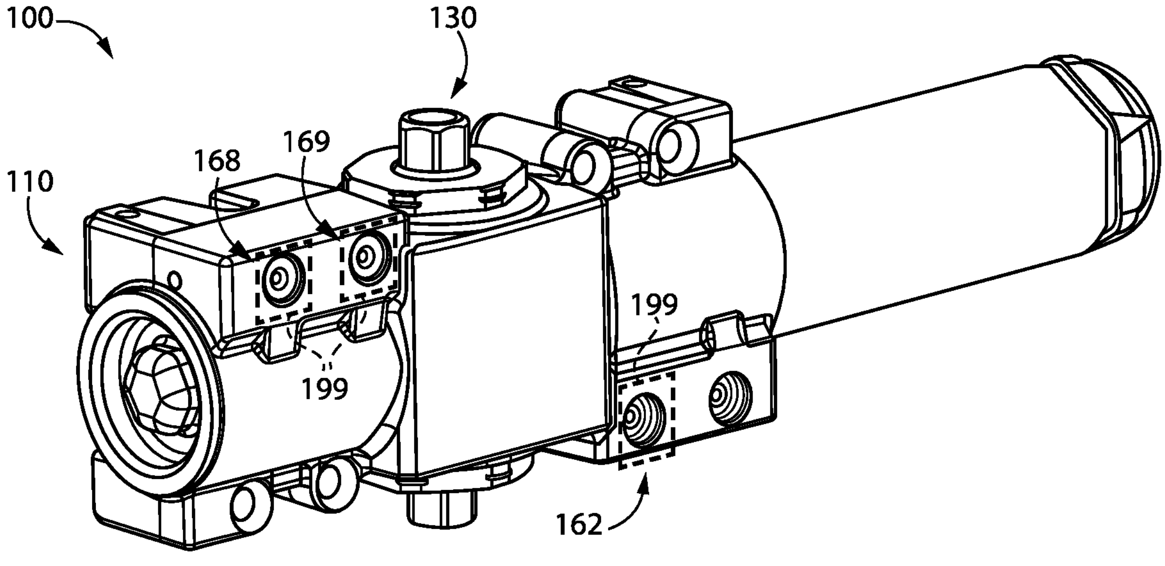
FIG. 2 is a perspective view of a door operator according to certain embodiments.
Figure 3:
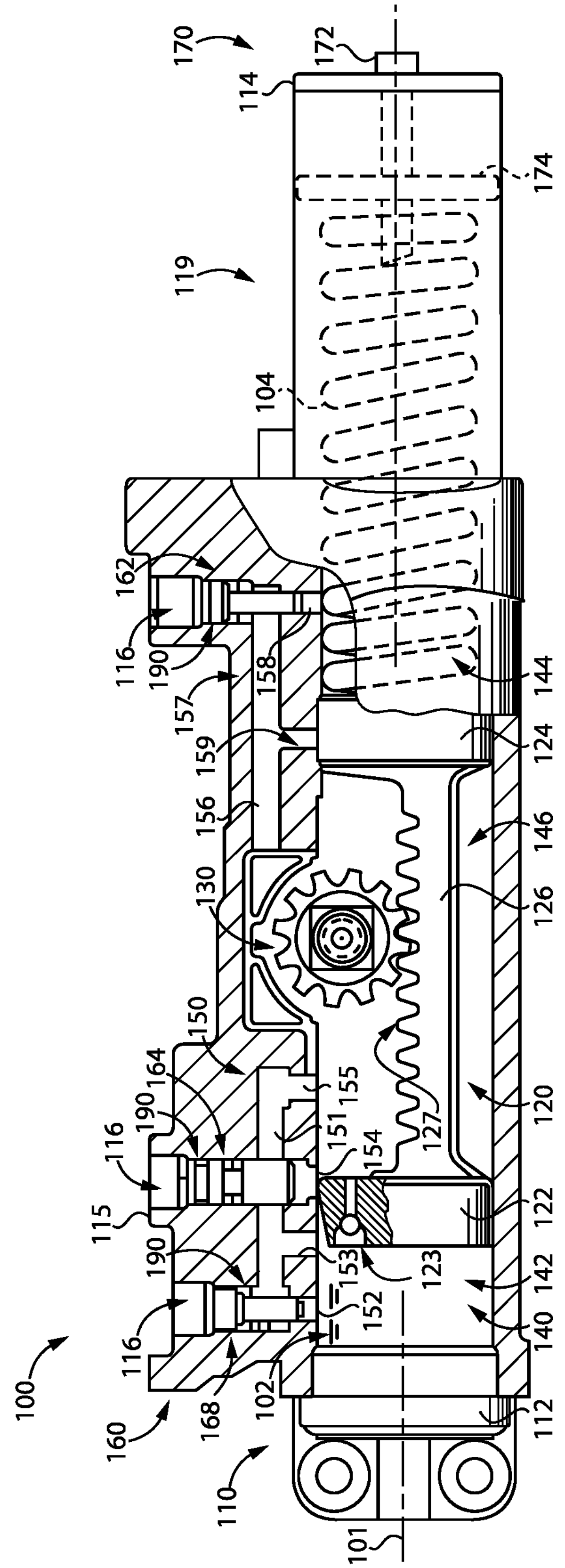
FIG. 3 is a partial cutaway view of a door operator according to certain embodiments.

With additional reference to FIG. 2, the door operator 100 generally includes a body 110, a pinion 130 rotatably mounted to the body 110, and an armature 82 connected with the pinion 130. In the illustrated form, the body 110 includes a tubular portion 119 that houses one or more springs 104 (FIG. 3). The spring(s) 104 linearly bias(es) a rack piston 120 (FIG. 3) engaged with the pinion 130 in a door-closing direction, thereby rotationally biasing the pinion 130 in a corresponding closing direction. The body 110 is mounted to one of the doorframe 72 or the door 74, and the armature 82 is connected between the pinion 130 and the other of the doorframe 72 or the door 74 such that the door operator 100 biases the door 74 toward its closed position.

In the illustrated form, the body 110 is mounted to the door 74, and the armature 82 is connected between the pinion 130 and the doorframe 72. In other embodiments, the body 110 may be mounted to the doorframe 72, and the armature 82 may be connected between the pinion 130 and the door 74. Additionally, while the illustrated armature 82 is provided in a "standard" configuration, in which the armature 82 extends away from the door 74 when the door 74 is in its closed position, it is also contemplated that the armature 82 may be provided in a "parallel arm" configuration, in which the armature 82 extends generally parallel to the door 74 when the door 74 is in its closed position. Furthermore, although the illustrated armature 82 includes two links that are pivotably coupled to one another at a joint 83, it is also contemplated that the armature 82 may include a single rigid arm including a first end that is coupled to the pinion 130 and an opposite second end that travels along a track.

In the illustrated form, the operator 100 is provided in the form of a door closer configured to urge the door 74 toward its closed position, and may be referred to herein as the closer 100. However, it should be appreciated that operators according to other embodiments may be additionally or alternatively operable to urge the door 74 toward its open position, and that the concepts described herein may be utilized in connection with such operators.

With additional reference to FIG. 3, the closer 100 extends along a longitudinal axis 101 defining a proximal direction (to the left in FIG. 3) and an opposite distal direction (to the right in FIG. 3). The closer 100 generally includes a body 110, a piston 120 mounted for reciprocal movement within the body 110, and a pinion 130 rotatably mounted to the body 110 and engaged with the piston 120. The body 110 defines a hydraulic chamber 140 including a plurality of sub-chambers and a plurality of passages 150 defining paths of fluid communication between the sub-chambers. The hydraulic chamber 140 is filled with a hydraulic fluid 102. The door closer 100 further includes a valve assembly 160 including a plurality of adjustment screws 190 that regulate the flow of the hydraulic fluid 102 through the passages 150. While one form of hydraulic door closer 100 is provided herein for purposes of illustration, it is to be appreciated that the embodiments described herein may be utilized in door operators (e.g., openers, closers, or other controls) of other forms and formats.

The body 110 defines the hydraulic chamber 140, and is filled with the hydraulic fluid 102. The body 110 includes a proximal end cap 112 enclosing a proximal end of the hydraulic chamber 140 and a distal end cap 114 enclosing a distal end of the hydraulic chamber 140. Also disposed in the body 110 is the spring 104, which is engaged with the piston 120 and biases the piston 120 in the proximal direction. The illustrated body 110 further defines a plurality of cavities 116, each of which extends through an outer surface 115 of the body 110. Each cavity 116 is in fluid communication with a corresponding one of the passages 150 and houses a corresponding and respective one of the adjustment screws 190.

The piston 120 is mounted for reciprocal movement within the hydraulic chamber 140, and generally includes a proximal wall 122, a distal wall 124, and a body portion 126 extending between and connecting the proximal wall 122 and the distal wall 124. As described herein, the proximal wall 122 and the distal wall 124 are closely engaged with the inner wall of the body 110 and separate the hydraulic chamber 140 into three sub-chambers. The proximal wall 122 includes a check valve 123, and the body portion 126 defines a rack gear 127 that is engaged with the pinion 130.

The pinion 130 is rotatably mounted to the body 110 and is engaged with the rack gear 127 such that rotation of the pinion 130 in opposite directions is correlated with the reciprocal movement of the piston 120. As described above, the armature 82 is mounted to the pinion 130 and is engaged with either the door 74 or the doorframe 83 such that swinging movement of the door 74 is correlated with rotation of the pinion 130, linear movement of the piston 120, and compression/extension of the spring 104. For example, opening movement of the door 74 is correlated with rotation of the pinion 130 in a door-opening direction (counter-clockwise in FIG. 3), distal movement of the piston 120, and compression of the spring 104. Conversely, closing movement of the door 74 is correlated with rotation of the pinion 130 in a door-closing direction (clockwise in FIG. 3), proximal movement of the piston 120, and expansion of the spring 104.

The hydraulic chamber 140 is divided into three portions or sub-chambers by the piston 120. More particularly, a proximal chamber 142 is defined between the proximal wall 122 and the proximal end cap 112, a distal chamber 144 is defined between the distal wall 124 and the distal end cap 114, and an intermediate chamber 146 is defined between the proximal wall 122 and the distal wall 124. As will be appreciated, the reciprocal movement of the piston 120 causes expansion and contraction of the proximal and distal chambers 142, 144, while the intermediate chamber 146 remains of a substantially constant volume. In certain forms, the hydraulic chamber 140 may be considered to include the passages 150.

The passages 150 include a proximal passage 151 including branches 152-156, and a distal passage 157 including branches 158, 159. The proximal passage 151 forms a fluid connection between the proximal chamber 142 and the intermediate chamber 146, and the distal passage 157 forms a fluid connection between the intermediate chamber 146 and the distal chamber 144. The branches 152-155, 157, 158 form selective paths of fluid communication between the various portions of the hydraulic chamber 140 based upon the position of the piston 120, and the valve assembly 160 regulates the flow of hydraulic fluid 102 through the passages 150. As described herein, the effective cross-sectional area of the passages 150 depends upon a number of factors, including the state of the valve assembly 160 and which of the branches are connected to which of the chambers.

The valve assembly 160 includes a backcheck speed regulation valve 162, a main speed regulation valve 164, and a latch speed regulation valve 168, each of which includes a corresponding and respective adjustment screw 190. Each adjustment screw 190 is mounted in a corresponding and respective cavity 116 and extends into a corresponding and respective one of the branches 152, 154, 158. As described herein, one or more of the adjustment screws 190 is associated with an indicator mechanism 199 operable to provide a visual indication of the current setting for the corresponding valve. Certain example embodiments of indicator mechanisms are described herein. In certain embodiments, one or more of the indicator mechanisms 199 may include a Geneva drive mechanism, for example as described below in connection with the indicator mechanism 200 illustrated in FIGS. 5-9. In certain embodiments, one or more of the indicator mechanisms 199 may include a planetary gear drive mechanism, for example as described below in connection with the indicator mechanism 300 illustrated in FIGS. 10-12. In certain embodiments, one or more of the indicator mechanisms 199 may include a rack and pinion mechanism, for example as described below in connection with the indicator mechanism 400 illustrated in FIGS. 13-17.

The closer 100 further includes a spring size adjustment mechanism 170 operable to adjust the preloading of the spring(s) 104 to thereby adjust the minimum biasing force applied by the closer 100. While the spring size adjustment mechanism 170 is not a valve as that term is used herein, the spring size adjustment mechanism 170 includes an adjustment screw 172. The adjustment screw 172 is rotatably mounted to the distal end cap 114, and the spring size adjustment mechanism 170 further includes an anchor plate 174 mounted to the adjustment screw 172 and engaged with the distal end of the spring 104. Rotation of the adjustment screw 172 in a first direction advances the anchor plate 174 proximally, thereby compressing the spring(s) 104 and increasing the biasing force provided by the closer 100. Conversely, rotation of the adjustment screw 172 in a second direction opposite the first direction moves the anchor plate 174 distally, thereby expanding the spring(s) 104 and decreasing the biasing force provided by the closer 100.

Figure 4:
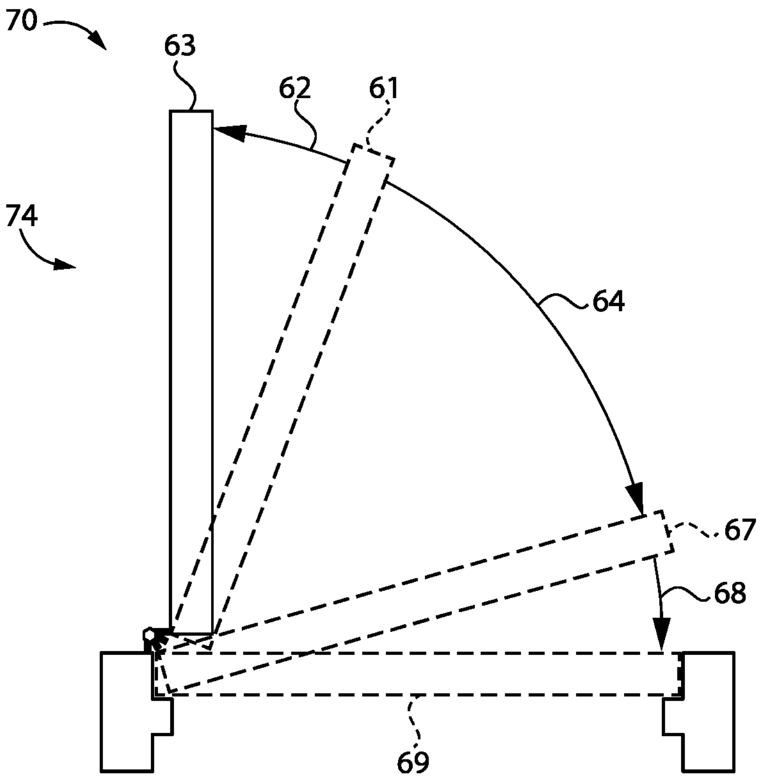
FIG. 4 is a schematic diagram of a door opening/closing movement.

With additional reference to FIG. 4, illustrated therein is a schematic representation of the closure assembly 70, in which various swing zones of the closure assembly 70 are denoted. During a full open/close cycle, the door 74 may begin in its closed position 69. When the door 74 is opened (e.g., manually by a user and/or under a motive force provided by a door-opening embodiment of the operator 100), the door 74 travels first to a backcheck position 61, and thereafter through a backcheck zone 62 to a fully open position 63. The movement speed of the door 74 through the backcheck zone 62 is regulated by the backcheck regulation valve 162. During a subsequent closing motion of the door 74 (e.g., under the biasing force provided by the closer 100), the door 74 travels through a main swing zone 64 to a transition position 67, and thereafter from the transition position 67 through a latching zone 68 to its fully closed position 69. The movement speed of the door 74 through the main swing zone 64 is regulated by the main speed regulation valve 164, and the movement speed of the door 74 through the latching zone 68 is regulated by the latch speed regulation valve 168.

Each adjustment screw 190 has a home or shut-off position, in which the adjustment screw 190 is fully advanced within its respective cavity 116. From this home position, the screw 190 can be rotated in a valve-opening direction (e.g., counter-clockwise) to open the valve and provide faster regulation within the corresponding zone. While other forms are contemplated, in the illustrated embodiment, each adjustment screw 190 can be rotated through about 3.5 turns in the valve-opening direction, with further rotation of the screw 190 beyond this terminal operating position risking removal of the screw and/or damage to the seal within the closer body 110. Thus, while other forms are contemplated, in the illustrated embodiment, rotating an adjustment screw 190 from its home position by one full turn may result in very slow regulation speed, rotating the screw 190 from its home position by one and a half turns may result in slow regulation speed, rotating the screw 190 by two full turns from its home position may result in normal regulation speed, rotating the screw 190 by two and a half turns from its home position may result in fast regulation speed, rotating the screw 190 by three full turns from its home position may result in very fast regulation speed, and rotating the screw 190 by three and a half full from its home position may result in no regulation such that the door 74 is likely to slam. Beyond the terminal operating position, which in the illustrated form is three and a half turns from the home position, further rotation of the screw 190 in the valve-opening direction may risk removal of the screw 190 and/or damage to the internal seal associated with the screw 190.

While one example of a terminal operating position has been provided herein, it should be appreciated that other terminal operating positions may be utilized. For example, an adjustment screw 190 may have a terminal operating position that is four turns from the home position, four and a half turns from the home position, or another number of turns from the home position. As will be appreciated, the number of turns required for a particular desired regulation speed may vary, including but not limited to varying according to the terminal operating position. Moreover, while the foregoing description lists regulation speed values corresponding to half-turn increments of the screw 190, it should be appreciated that regulation speed values may vary according to other turn increments.

Figure 5:
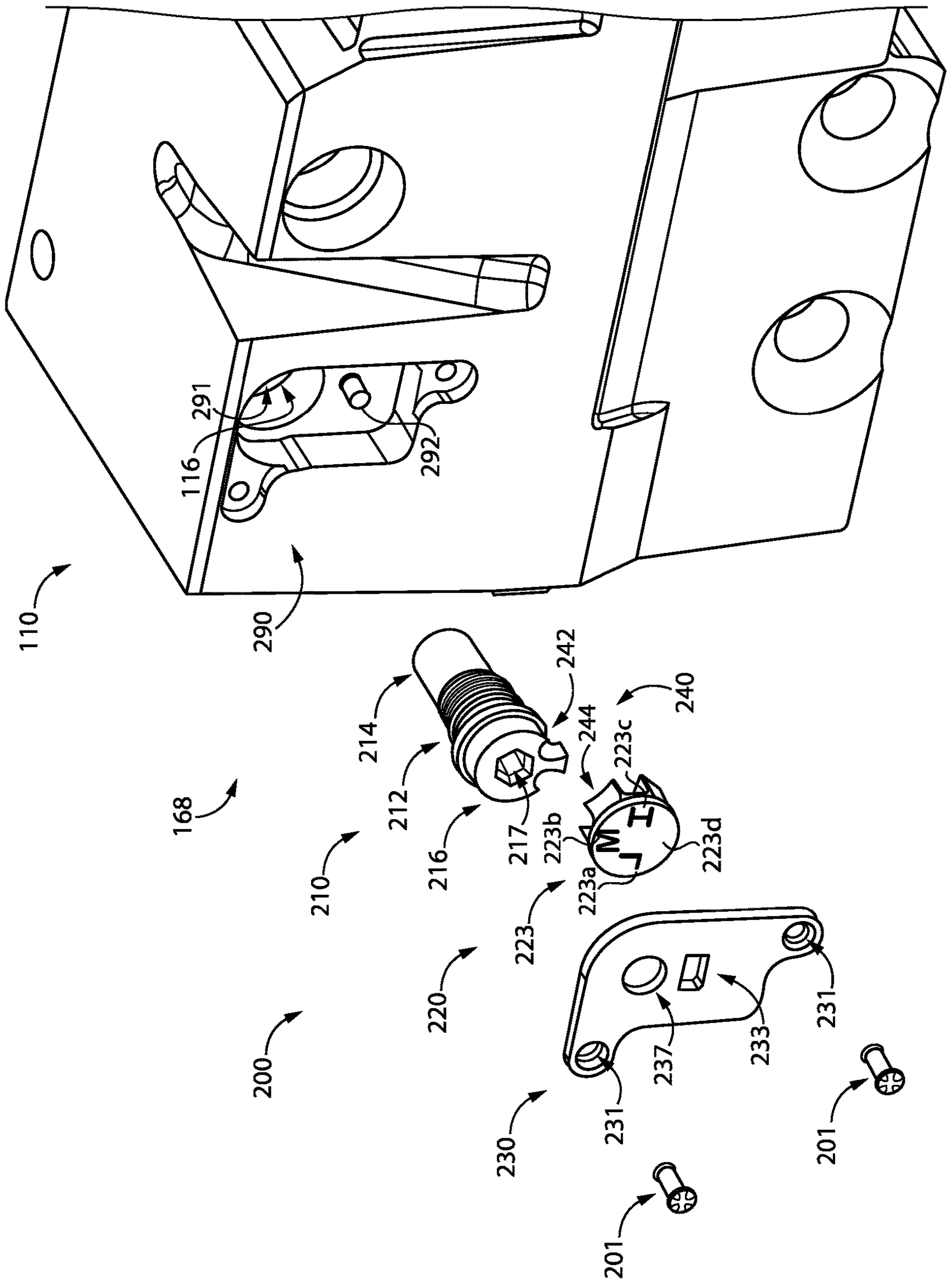
FIG. 5 is an exploded assembly view of a door operator including an indicator mechanism according to certain embodiments.

With additional reference to FIG. 5, illustrated therein is an indicator mechanism 200 according to certain embodiments. The indicator mechanism 200 is mounted within a mounting recess 290 of the closer body 110, with the mounting recess 290 being formed about or adjacent one of the cavities 116. The indicator mechanism 200 generally includes an adjustment screw 210 corresponding to the adjustment screw 190, an indicator wheel 220 operable to engage and be rotated by the adjustment screw 210, and a cover plate 230 that encloses the adjustment screw 210 and the indicator wheel 220 within the mounting recess 290. As described herein, the indicator mechanism 200 further includes a Geneva drive mechanism 240, which is defined in part by the adjustment screw 210 and in part by the indicator wheel 220.

While the illustrated indicator mechanism is associated with the latch speed regulation valve 168, it should be appreciated that an indicator mechanism along the lines of the indicator mechanism 200 may be additionally or alternatively utilized in connection with another regulation valve, such as the backcheck regulation valve 162 and/or the main swing regulation valve 164. Moreover, the indicator mechanism 200 may be utilized to indicate the status of another adjustment mechanism having an adjustment screw, such as the spring size adjustment mechanism 170.

Figure 6:
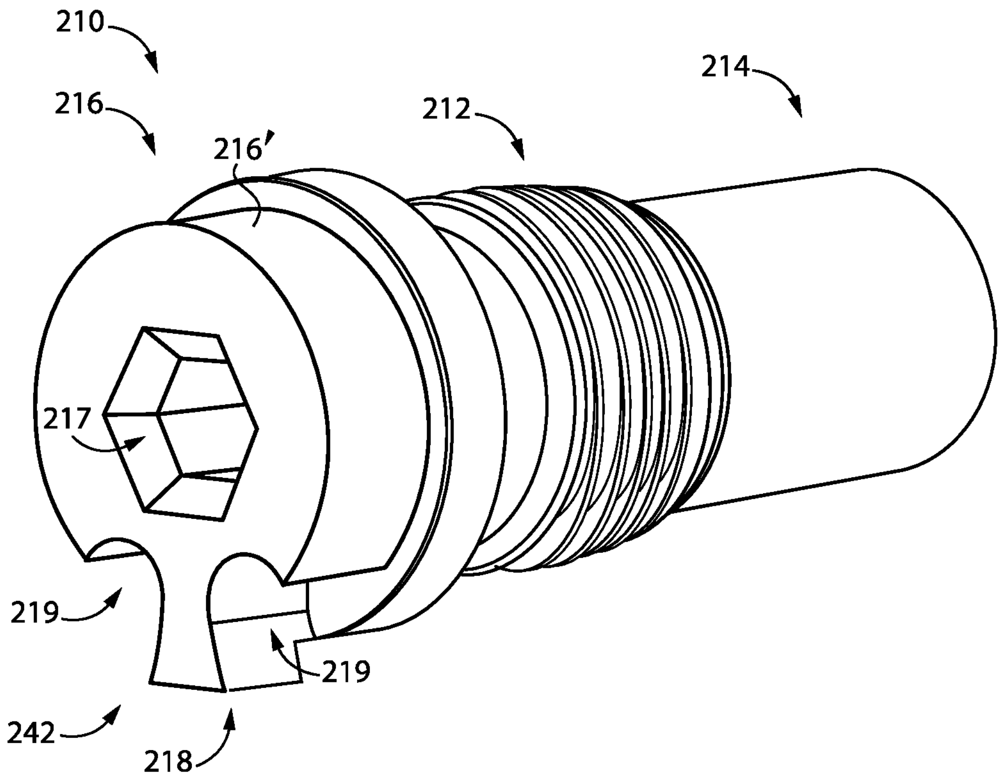
FIG. 6 is a perspective illustration of an adjustment screw of the indicator mechanism illustrated in FIG. 5.

With additional reference to FIG. 6, the adjustment screw 210 is rotatably mounted in the cavity 116, and includes a threaded body portion 212, a stem 214 extending from a first side of the body portion 212 and into the cavity 116, and a head 216 extending from an opposite second side of the body portion 212. The head 216 is generally cylindrical, and includes a recess 217 configured to receive the tip of a tool (e.g., a hex key) by which the screw 210 can be rotated in opposite directions to advance and retract the screw 210. The head 216 further includes a radial arm 218, with recesses 219 positioned on either side of the arm 218. As described herein, the arm 218 at least partially defines a drive component 242 of the Geneva drive mechanism 240.

Figure 7:
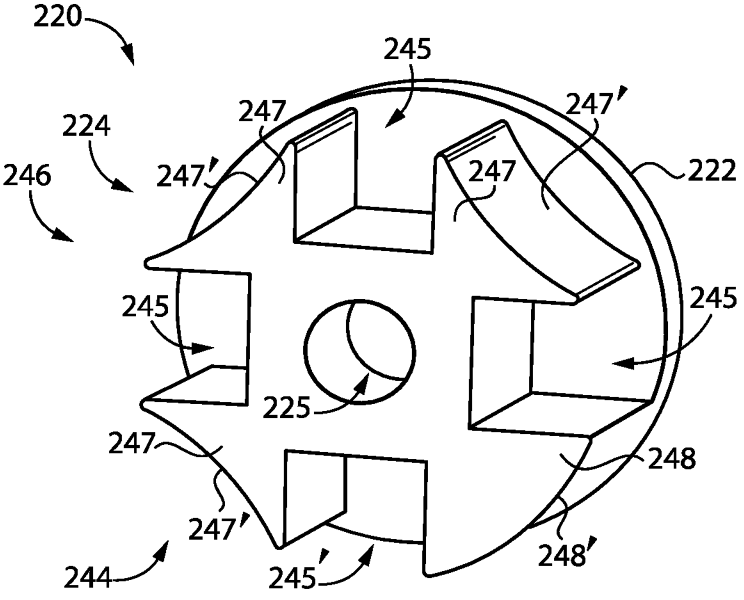
FIG. 7 is a perspective illustration of an indicator wheel of the indicator mechanism illustrated in FIG. 5.

With additional reference to FIG. 7, the indicator wheel 220 is rotatably mounted within the mounting recess 290, for example on a cylindrical boss 292. The indicator wheel 220 generally includes a plate portion 222 and a boss 224 formed on a rear side of the plate portion 222. The front side of the plate portion 222 includes one or more indicia 223 relating to the regulation speed currently being provided by the latch speed regulation valve 168. More particularly, the indicia 223 include a first indicium 223*a* relating to a first regulation speed of the valve 168, a second indicium 223*b* relating to a second regulation speed of the valve 168, and a third indicium 223*c* relating to a third regulation speed of the valve 168. In the illustrated form, the indicia 223 further include a blank space 223*d*, which indicates that the valve 168 is in the home position. As described herein, the indicator wheel 220 is configured to selectively display an appropriate one of the indicia 223 via an indicator window 233 in the cover plate 230 to thereby indicate to the user the current regulation speed being provided by the valve 168. The boss 224 of the indicator wheel 220 includes a cylindrical cavity 225, which receives the cylindrical boss 292 of the mounting location 290 such that the indicator wheel 220 is rotatably mounted within the mounting recess 290. As described herein, the boss 224 defines a driven component 244 of the Geneva drive mechanism 240.

In the illustrated form, the first through third indicia 223*a*, 223*b*, 223*c* are provided in the form of letters, and the fourth indicium 224*d* is provided in the form of a blank space. More particularly, the first indicium 223*a* includes an L to indicate a low regulation speed, the second indicium 223*b* includes an M to indicate medium regulation speed, and the third indicium includes an H to indicate high regulation speed. It is also contemplated that one or more of the indicia 223 may include additional or alternative forms of indicia, such as colors, symbols, and/or numbers.

The cover plate 230 is secured to the closer body 110 to thereby enclose the adjustment screw 210 and the indicator wheel 220 within the mounting recess 290. In the illustrated form, the cover plate 230 is secured to the closer body 110 via one or more fasteners 201 that extend through fastener apertures 231 into threaded fastener recesses 291 of the mounting recess 290. It is also contemplated that the cover plate 230 may be secured to the closer body 110 in another manner, such as one including the use of snap features and/or adhesives. The cover plate 230 includes an indicator window 233 through which the indicia 223 are selectively displayed, and a tool-receiving aperture 237 aligned with the recess 217 such that the tool (e.g., a hex key) can be inserted into the recess 217 via the aperture 237. In the illustrated embodiment, the diameter of the aperture 237 is less than the diameter of the head 216 such that the cover plate 210 provides a positive stop against withdrawal of the adjustment screw 210 beyond its terminal operating position. As described herein, such retraction may additionally or alternatively be hindered by the Geneva drive mechanism 240.

As indicated above, the Geneva drive mechanism 240 generally includes a drive component 242 defined at least in part by the adjustment screw 210, and a driven component 244 defined at least in part by the indicator wheel 220. More particularly, the drive component 242 includes the head 216 of the adjustment screw 210, and the driven component 244 includes the boss 224 of the indicator wheel 220. The driven component 244 generally includes a plurality of recesses 245, which are separated from one another by a plurality of wheel teeth 246. The plurality of wheel teeth 246 includes a plurality of active wheel teeth 247 and a dead-stop wheel tooth 248. Each active wheel tooth 247 includes a concave surface 247' that permits rotation of the driving component 242, and the dead-stop wheel tooth 248 includes a convex surface 248' that prevents further rotation of the driving component 242.

Operation of the indicator mechanism 200 may begin with the adjustment screw 210 in its fully advanced or home position. In this position, the blank space 223*d* is aligned with the window 233, thereby indicating to the user that the valve 168 is fully closed. Additionally, the arm 218 may be received in one of the recesses 245 adjacent the dead-stop tooth 248. From this home position, rotation of the adjustment screw 210 in the valve-opening direction causes the arm 218 to engage the aligned recess 245 and rotate the indicator wheel 220 through a predetermined angle. When the arm 218 exits the recess 245, the concave surface 247' of the next active wheel tooth 247 provides clearance for the outer circumference 216' of the screw head 216 such that the adjustment screw 210 can continue to be rotated in the valve opening direction without immediately causing further rotation of the indicator wheel 220. As the screw 210 completes a full turn, the arm 218 approaches and engages the next recess 245, thereby further rotating the indicator wheel 220 and causing the first indicium 223*a* to align with the window 233. Thus, after one full turn in the opening direction, the first indicium 223*a* is displayed, thereby indicating to the user that the valve 168 is providing low regulation speed.

For further adjustment of the regulation speed provided by the valve 168, the screw 210 may be rotated in either direction. Those skilled in the art will readily recognize that a full turn of the screw 210 in the valve-closing direction will return the indicator wheel 220 to a position in which the blank indicium 223*d* is displayed via the window 233, while a full turn (i.e., a 360° rotation) of the screw 210 in the valve-opening direction will rotate the indicator wheel 220 by a predetermined angle such that the second indicium

**223*b* is displayed via the window 233. In the illustrated form, the indicator of the cover plate 230 is a window 233 through which the indicia 223 are selectively visible. It is also contemplated that the indicator may take another form, such as one including a demarcation (e.g., and line or an arrow) with which the indicia 223** selectively align.

As should be evident from the foregoing, each full turn of the screw 210 from its home position causes the Geneva drive mechanism 240 to rotate the indicator wheel 220 by a predetermined angle. In the illustrated form, the predetermined angle is about 90° (e.g., between 85° and 95°), and the indicia 223 are offset from one another by about 90°. It should be appreciated that other predetermined angles may be utilized. In such forms, the indicia 223 may be offset from one another by the appropriate predetermined angle.

Figure 8:
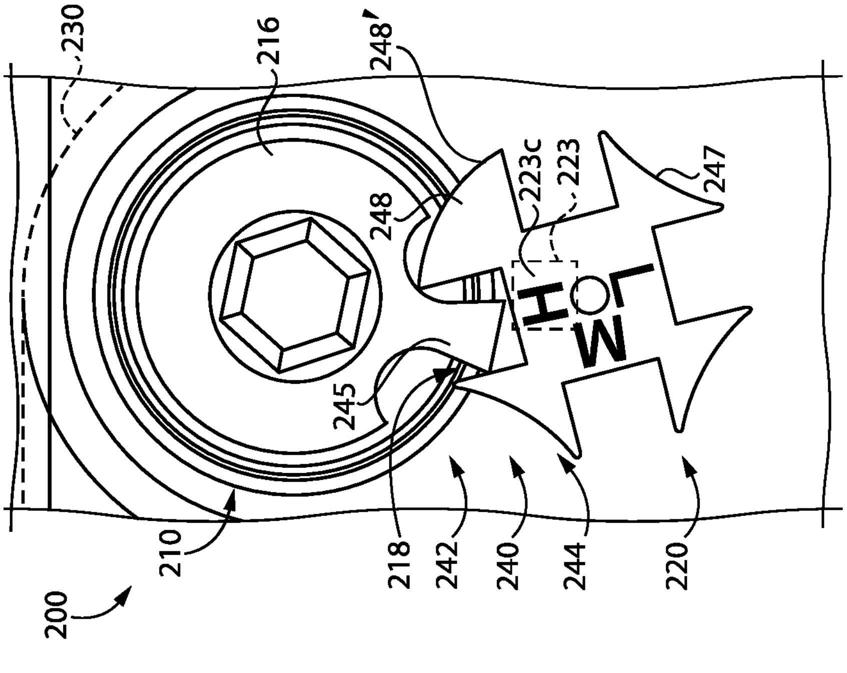
FIG. 8 is a plan view of the indicator mechanism illustrated in FIG. 5 with the indicator wheel in a dead stop position.

With additional reference to FIG. 8, those skilled in the art will readily recognize from the foregoing that rotation of the screw 210 from its home position by three full turns in the valve-opening direction will result in the third indicium **223*c* being displayed via the window 233. Such rotation also results in the arm 218 engaging the final recess 245, which is adjacent the dead-stop wheel tooth 248. In this position, further rotation of the screw 210 in the valve-opening direction is prevented by the convex surface 248', which engages the outer perimeter 216' of the head 216 and interferes with further rotation of the screw 210. As a result, the adjustment screw 210 cannot be withdrawn beyond its terminal operational position, and damage to the closer 100** is inhibited.

Figure 9:
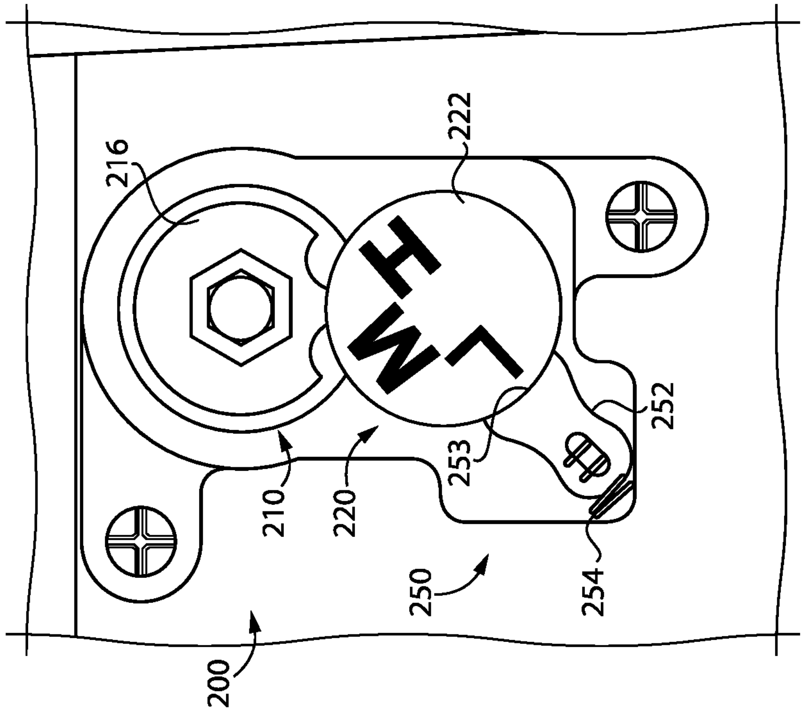
FIG. 9 is a plan view of the indicator mechanism illustrated in FIG. 5 along with a movement resistance mechanism according to certain embodiments.

With additional reference to FIG. 9, certain embodiments of the indicator mechanism 200 may further include a movement resistance mechanism 250 configured to resist rotation of the indicator wheel 220. The illustrated movement resistance mechanism 250 is mounted within the mounting recess 290, and generally includes a movable body 252 and a bias member such as a spring 254 engaged between the movable body 252 and the closer body 110 and biasing the body 252 into engagement with the indicator wheel 220. The body 252 includes a concave surface 253 that interfaces with the outer perimeter of the plate portion 222 and provides frictional resistance to rotation of the indicator wheel 220. Such resistance may maintain the intended position of the indicator wheel 220 during movement of the door, slamming of the door, vibration of the door, abuse cases, and other actions that may otherwise cause unwanted rotation of the indicator wheel 220.

While the illustrated bias member is provided in the form of a compression spring 254, it is also contemplated that the bias member may be provided in another form, such as one including an extension spring, a leaf spring, a torsion spring, and/or magnets. Moreover, although the illustrated movement resistance mechanism 250 continuously resists rotation of the indicator wheel 220, it is also contemplated that a movement resistance mechanism may intermittently resist rotation of the indicator wheel 220 from one or more discrete rotational positions. As one example, the movable body 252 may be provided with a roller, and the perimeter of the plate portion 222 may include one or more recesses into which the roller may seat to selectively discourage rotation of the indicator wheel 220 from one or more discrete rotational positions corresponding to the one or more recesses.

Figure 10:
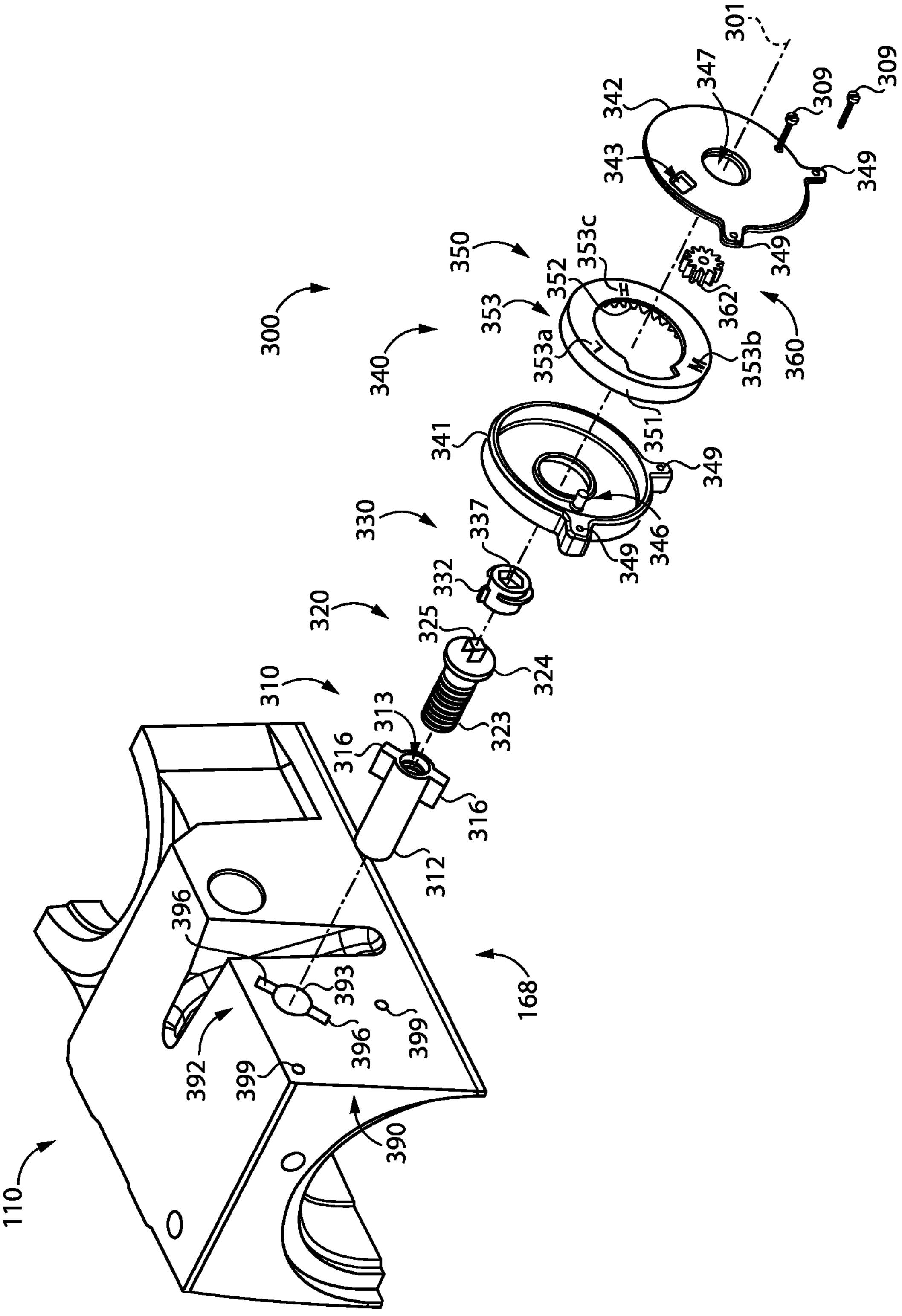
FIG. 10 is an exploded assembly view of a door operator including an indicator mechanism according to certain embodiments.

With additional reference to FIG. 10, illustrated therein is an indicator mechanism 300 according to certain embodiments, along with a portion of the closer body 110. The closer body 110 includes a mounting location 390 that facilitates mounting the indicator mechanism 300, and the illustrated mounting location 390 includes a cavity 392 open to the cavity 116 for one of the valves 160 (e.g., the latch speed valve 168). At least an initial or outer portion of the cavity 392 is non-circular in shape. In the illustrated form, the cavity 392 includes a circular portion 393 and a pair of diametrically opposite channels 396 extending from the circular portion 393. The mounting location 390 may further include one or more fastener openings 399 for receiving fasteners 309 (e.g., screws) by which the indicator mechanism 300 may be secured to the closer body 110.

The indicator mechanism 300 extends along a central axis 301, and generally includes a lead nut 310 slidably mounted in the cavity 392, an adjustment screw in the form of a lead screw 320 threadedly engaged with the lead nut 310, a pinion gear 330 rotationally coupled with the lead screw 320, a housing 340 secured to the closer body 110, a ring gear 350 rotatably mounted in the housing 340, and a planet gear 360 rotatably mounted in the housing 340. As described herein, the planet gear 360 is engaged with the ring gear 350 and is operable to be rotated by the pinion gear 330 to selectively align indicia 353 of the ring gear 350 with an indicator window 343 of the housing 340. The indicator mechanism 300 may thus be considered to include a planetary gear set mechanism 304 that moves one component (e.g., the ring gear 350) relative to another component (e.g. the pinion gear 330) in response to rotation of the adjustment screw 320.

In the illustrated embodiment, the indicator mechanism 300 is associated with the latch valve 168 of the closer 100. It is also contemplated that the indicator mechanism 300 may additionally or alternatively be associated with another regulation valve of the valve assembly 160, such as the backcheck valve 162 and/or the main swing valve 164. Moreover, the indicator mechanism 300 may be utilized to indicate the status of another adjustment mechanism having an adjustment screw, such as the spring size adjustment mechanism 170.

Figure 11:
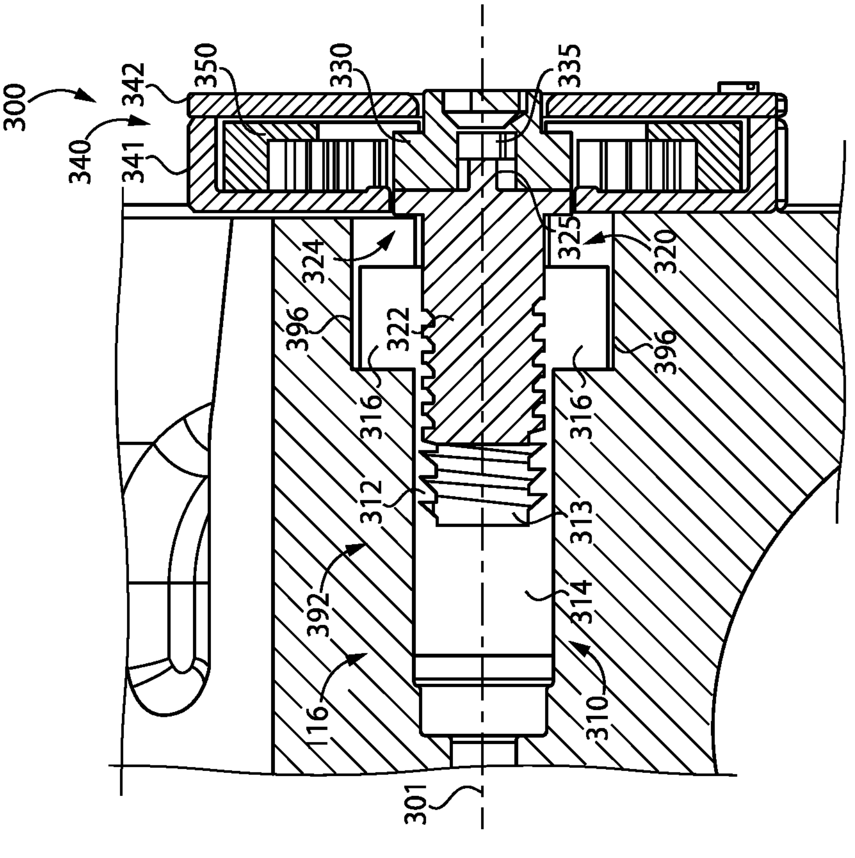
FIG. 11 is a cross-sectional illustration of the door operator and indicator mechanism illustrated in FIG. 10.

With additional reference to FIG. 11, the lead nut 310 is slidably mounted in the cavity 392 for sliding movement along the central axis 301, and generally includes a body member 312 having a pair of splines 316 extending radially outward from the body member 312. The body member 312 includes a threaded cavity 313 that receives a threaded shank 323 of the lead screw 320, and which is delimited by an end wall 314. The body member 312 is received in the circular portion 393 of the cavity 392, and the splines 316 are received in the channels 396 to rotationally couple the lead nut 310 with the closer body 110. The depth of the channels 396 is greater than the axial length of the splines 316 such that the splines 316 are operable to slide axially along the channels 396. As such, the lead nut 310 is slidable along the central axis 301 while being rotationally coupled to the closer body 110. As should be appreciated, sliding motion of the lead nut 310 along the central axis 301 advances and withdraws the lead nut 310 within the cavity 116, thereby adjusting the regulation speed provided by the latch valve 168.

The lead screw 320 generally includes a threaded shank 323 that extends into the threaded cavity 313 of the lead nut 310, and a head 324 positioned at an outer end of the shank 323. In the illustrated form, the head 324 includes an engagement feature 325 operable to engage a corresponding engagement feature 335 of the pinion gear 330 to rotationally couple the lead screw 320 and the pinion gear 330. It is also contemplated that the lead screw 320 may be rotationally coupled with the pinion gear 330 in an additional and/or alternative manner. For example, the head 324 may be adhered to the pinion gear 330 or integrally formed with the pinion gear 330. The diameter of the head 324 is greater than the diameter of the circular portion 393 such that inward travel of the lead screw 320 is prevented by engagement of the head 324 with the outer surface of the closer body 110. As described herein, outward travel of the lead screw 320 may likewise be prevented by the housing 340.

During operation of the indicator mechanism 300, rotation of the lead screw 320 in a first direction advances the lead nut 310 further into the cavity 392 and toward its home or fully closed position to reduce the speed provided by the latch valve 168. Conversely, rotation of the lead screw 320 in an opposite second direction withdraws the lead nut 310 toward its terminal operating position, thereby increasing the speed provided by the latch valve 168.

The pinion gear 330 is rotationally coupled with the lead screw 320, and includes at least one tooth 322 operable to engage a corresponding set of teeth 362 on the planet gear 360. In the illustrated form, the pinion gear 330 is partially-toothed, and more particularly includes a single tooth 322. It is also contemplated that the pinion gear 330 may include more teeth, and in certain embodiments may be fully-toothed. A rear side of the pinion gear 330 includes an engagement feature 335 that engages the engagement feature 325 of the lead screw 320 to rotationally couple the lead screw 320 with the pinion gear 330. A front side of the pinion gear 330 includes a recess 337 configured to receive the tip of a tool (e.g., a hex key) by which the pinion gear 330 (and thus the lead screw 320) can be rotated in opposite directions to advance and withdraw the lead nut 310.

The housing 340 is secured to the closer body 110, and generally includes a case 341 and a cover plate 342 coupled to the case 341 to thereby define an internal chamber 348 in which the pinion 330, the ring gear 350, and the planet gear 360 are mounted. The case 341 includes a cylindrical post 346 on which the planet gear 360 is rotatably mounted. The illustrated cover plate 342 includes an indicator window 343 with which indicia 353 of the ring gear 350 are selectively aligned to thereby indicate the regulation speed being provided by the latch valve 168. As with the previously-described embodiment, while the illustrated indicator is provided in the form of a window 343, it is also contemplated that another form of indicator may be utilized, such as a demarcation (e.g., a line or an arrow) that selectively aligns with the indicia 353. The cover plate 342 also includes an aperture 347 aligned with the recess 337 such that the tip of the tool can be inserted via the aperture 347 for engagement with the recess 337 and rotation of the lead screw 320.

The housing 340 may include fastener apertures 349 through which fasteners 309 may extend to secure the housing 340 to the closer body 110 such that the housing 340 blocks outward movement of the lead nut 310 beyond its terminal operating position. It is also contemplated that the housing 340 may be secured to the closer body 110 in another manner, such as via adhesives. Moreover, while the illustrated housing 340 is provided on the surface of the closer body 110, it is also contemplated that the mounting location 390 may include a recess operable to receive the housing 340 such that the cover plate 342 is substantially flush with the outer surface of the closer body 110.

The ring gear 350 includes an outer ring 351 and a plurality of teeth 352 that project radially inward from the outer ring 351. As described herein, the teeth 352 engage with the teeth 362 of the planet gear 360 such that the ring gear 350 rotates in response to rotation of the planet gear 360. A front side of the ring gear 350 includes a plurality of indicia 353, each of which is operable to selectively align with the indicator window 343 to indicate to the user the level of regulation speed being provided by the latch valve 168. The indicia 353 include a first indicium 353*a* relating to a first regulation speed of the valve 168, a second indicium 353*b* relating to a second regulation speed of the valve 168, and a third indicium 353*c* relating to a third regulation speed of the valve 168. In the illustrated form, the first through third indicia 353*a*, 353*b*, 353*c* are provided in the form of letters. More particularly, the first indicium 353*a* includes an L to indicate a low regulation speed, the second indicium 353*b* includes an M to indicate medium regulation speed, and the third indicium includes an H to indicate high regulation speed. It is also contemplated that one or more of the indicia 353 may include additional or alternative forms of indicia, such as colors, symbols, and/or numbers.

The planet gear 360 is rotatably mounted within the housing 340 for rotation about the post 346. The planet gear 360 includes a plurality of teeth 362 that are meshed with the teeth 352 of the ring gear 350 and are operable to be engaged by the at least one tooth 332 of the pinion gear 330. The size, shape, and/or number of the teeth 332, 352, 362 are selected such that the ring gear 350 rotates through a predetermined angle in response to a 360° rotation of the pinion gear 330, with the predetermined angle being less than 360°. While other predetermined angles are contemplated, the predetermined angle of the illustrated embodiment is about 120° (e.g., between 110° and 130°). In the illustrated form, the indicia 353 are offset from one another by the predetermined angle such that one full rotation of the pinion gear 330 causes a first of the indicia 353 to move out of alignment with the indicator window 343 and another of the indicia 353 to move into alignment with the indicator window 343.

Figure 12:
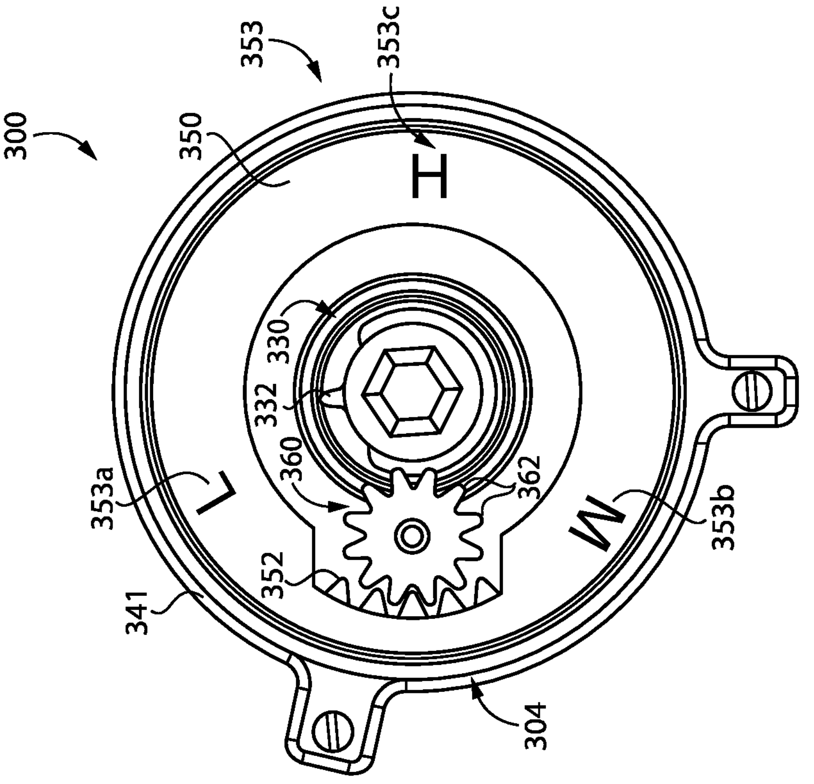
FIG. 12 is a plan view of the indicator mechanism illustrated in FIG. 10.

While not specifically illustrated in FIGS. 10-12, it should be appreciated that the indicator mechanism 300 may include a movement resistance mechanism along the lines of that described above with reference to FIG. 9. For example, such a movement resistance mechanism may be configured to resist rotation of the ring gear 350 and/or the planet gear 360.

Figure 13:
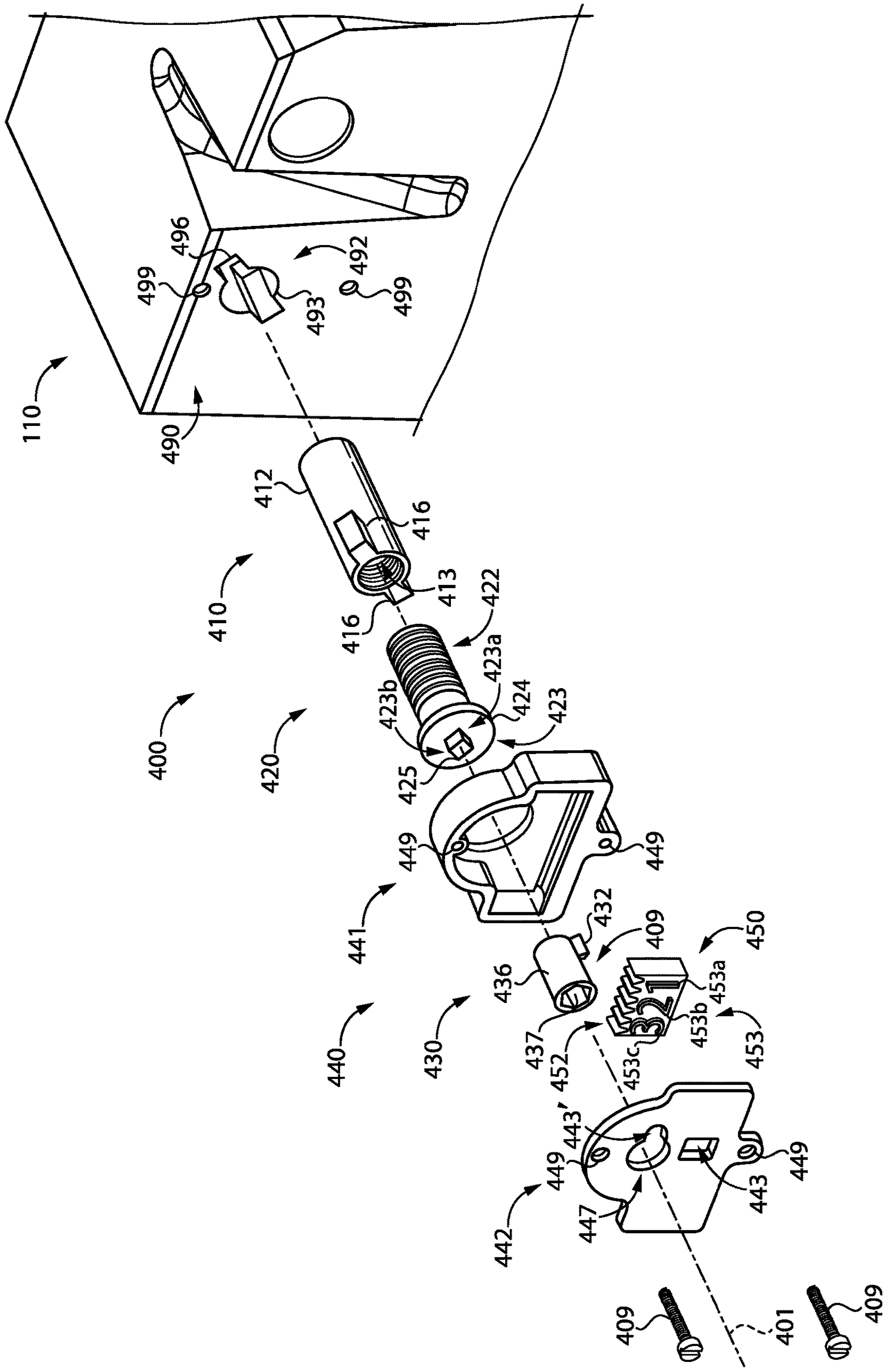
FIG. 13 an exploded assembly view of a door operator including an indicator mechanism according to certain embodiments.

With additional reference to FIG. 13, illustrated therein is an indicator mechanism 400 according to certain embodiments, along with a portion of the closer body 110. The closer body 110 includes a mounting location 490 that facilitates mounting the indicator mechanism 400, and the illustrated mounting location 490 includes a cavity 492 open to the cavity 116 for one of the valves 160 (e.g., the latch speed valve 168). At least an initial or outer portion of the cavity 492 is non-circular in shape. In the illustrated form, the cavity 492 includes a circular portion 493 and a pair of diametrically opposite channels 496 extending from the circular portion 493. The mounting location 490 may further include one or more fastener openings 499 for receiving fasteners 409 (e.g., screws) by which the indicator mechanism 400 may be secured to the closer body 110.

The indicator mechanism 400 extends along a central axis 401, and generally includes a lead nut 410 slidably mounted in the cavity 492, an adjustment screw in the form of a lead screw 420 threadedly engaged with the lead nut 410, a pinion gear 430 rotationally coupled with the lead screw 420, a housing 440 secured to the closer body 110, and an indicator plate 450 slidably mounted in the housing 440. As described herein, the indicator plate 450 is operable to be linearly shifted by the pinion gear 430 to selectively align primary indicia 453 of the indicator plate 450 with an indicator window 443 of the housing 440. The indicator mechanism 400 may thus be considered to include a rack and pinion mechanism 404 that moves one component (e.g., the indicator plate 450) relative to another component (e.g. the pinion gear 430) in response to rotation of the adjustment screw 420.

In the illustrated embodiment, the indicator mechanism 400 is associated with the latch valve 168 of the closer 100. It is also contemplated that the indicator mechanism 400 may additionally or alternatively be associated with another regulation valve of the valve assembly 160, such as the backcheck valve 162 and/or the main swing valve 164. Moreover, the indicator mechanism 400 may be utilized to indicate the status of another adjustment screw, such as the adjustment screw 172 of the spring size adjustment mechanism 170.

Figure 14:
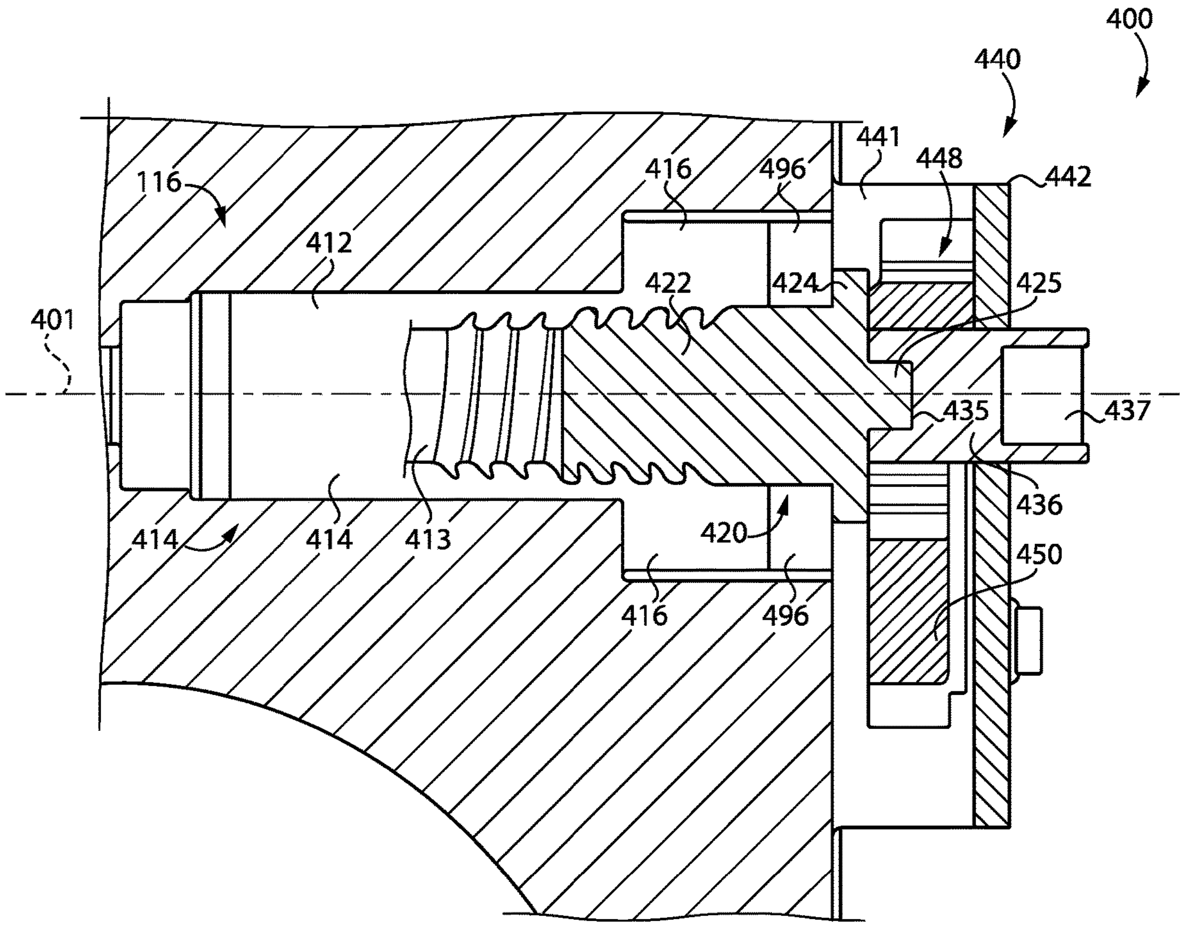
FIG. 14 is a cross-sectional illustration of the door operator and indicator mechanism illustrated in FIG. 13.

With additional reference to FIG. 14, the lead nut 410 is mounted in the cavity 492 for sliding movement along the central axis 401, and generally includes generally includes a body member 412 having a pair of splines 416 extending radially outward from the body member 412. The body member 412 includes a threaded cavity 413 that receives a threaded shank 423 of the lead screw 420, and which is delimited by an end wall 414. The body member 412 is received in the circular portion 493 of the cavity 492, and the splines 416 are received in the channels 496 to rotationally couple the lead nut 410 with the closer body 110. The depth of the channels 496 is greater than the axial length of the splines 416 such that the splines 416 are operable to slide axially along the channels 496. As such, the lead nut 410 is slidable along the central axis 401 while being rotationally coupled to the closer body 110. As should be appreciated, sliding motion of the lead nut 410 along the central axis 401 advances and withdraws the lead nut 410 within the cavity 116, thereby adjusting the regulation speed provided by the latch valve 168.

The lead screw 420 generally includes a threaded shank 423 that extends into the threaded cavity 413 of the lead nut 410, and a head 424 positioned at an outer end of the shank 423. In the illustrated form, the head 424 includes an engagement feature 425 operable to engage a corresponding engagement feature 435 of the pinion gear 430 to rotationally couple the lead screw 420 and the pinion gear 430. It is also contemplated that the lead screw 420 may be rotationally coupled with the pinion gear 430 in an additional and/or alternative manner. For example, the head 424 may be adhered to the pinion gear 430 or integrally formed with the pinion gear 430. The diameter of the head 424 is greater than the diameter of the circular portion 493 such that inward travel of the lead screw 420 is prevented by engagement of the head 424 with the outer surface of the closer body 110. As described herein, outward travel of the lead screw 420 is likewise prevented by the housing 440.

During operation of the indicator mechanism 400, rotation of the lead screw 420 in a first direction advances the lead nut 410 further into the cavity 492 and toward its home or fully closed position to thereby reduce the regulation speed provided by the latch valve 168. Conversely, rotation of the lead screw 420 in an opposite second direction withdraws the lead nut 410 toward its terminal operating position, thereby increasing the regulation speed provided by the latch valve 168.

In certain embodiments, the lead screw 420 may further include one or more secondary indicia 423 formed on the front side of the head 424 and selectively aligned with a secondary indicator window 443' of the housing 440. As described herein, such secondary indicia 423 may enhance the resolution or granularity of the indication of the regulation speed being provided by the valve 168. In the illustrated form, the primary indicia 453 of the indicator plate 450 provide a visual indication regarding the number of full turns of the lead screw 420, and the secondary indicia 423 of the lead screw 420 provide an indication regarding fractional turns of the lead screw 420 from its home position. In the illustrated embodiment, the secondary indicia 423 include a first secondary indicium **423*a* indicating that the lead screw 420 has been rotated from its home position by an integer number of turns, and a second secondary indicium 423*b* indicating that the lead screw 420 has been rotated from its home position by a non-integer number of turns. In the illustrated form, the second indicium 423*b* is positioned to align with the secondary indicator window 443' when the rotation of the lead screw 420 is an integer number of turns plus an additional half turn. As such, the second indicium 423*b*** is indicative of a half-turn rotation, and in the illustrated embodiment includes the fraction "½."

It is also contemplated that additional and/or alternative indicia may be positioned to align with the secondary indicator window 443' when the rotation of the lead screw 420 is an integer number of turns plus another fraction of a turn (e.g., a third of a turn or a quarter of a turn), and that the form of one or more of the secondary indicia 423 may be correspondingly modified (e.g., to read "⅓" or "⅔"). For example, an indicium positioned to align with the secondary indicator window 443' when the rotation of the lead screw 420 is an integer number of turns plus a third of a turn, and such an indicium may read "⅓" or "120°," while an indicium positioned to align with the secondary indicator window 443' when the rotation of the lead screw 420 is an integer number of turns plus two thirds of a turn may read "⅔" or "240°". While certain examples for the secondary indicia 423 have been discussed herein, it should be appreciated that the secondary indicia 423 may include additional and/or alternative features, such as colors, symbols, letters, and other indicia. Moreover, although the secondary indicia 423 of the illustrated embodiment are provided on the lead screw 420, it is also contemplated that the secondary indicia 423 may be provided on another component, such as the pinion gear 430.

The pinion gear 430 is rotationally coupled with the lead screw 420, and includes at least one tooth 422 operable to engage a corresponding set of teeth 462 on the indicator plate 450. In the illustrated form, the pinion gear 430 is partially-toothed, and more particularly includes a single tooth 422. It is also contemplated that the pinion gear 430 may include more teeth, and in certain embodiments may be fully-toothed. A rear side of the pinion gear 430 includes an engagement feature 435 that engages the engagement feature 425 of the lead screw 420 to rotationally couple the lead screw 420 with the pinion gear 430. A front side of the pinion gear 430 includes a recess 437 configured to receive the tip of a tool (e.g., a hex key) by which the pinion gear 430 (and thus the lead screw 420) can be rotated in opposite directions to advance and withdraw the lead nut 410. In the illustrated form, the pinion gear 430 includes a post 436 that extends through an aperture 446 in a cover plate 442 of the housing 442, and in which the recess 437 is formed. It is also contemplated that the pinion gear 430 may not necessarily extend through the aperture 446, and that the recess 437 may be positioned within the housing 440.

The housing 440 is secured to the closer body 110, and generally includes a case 441 and a cover plate 442 coupled to the case 441 to thereby define an internal chamber 448 in which the rack and pinion mechanism 404 is mounted. The illustrated cover plate 442 includes a primary indicator window 443 with which primary indicia 453 of the indicator plate 450 are selectively aligned to thereby provide a gross indication of the regulation speed being provided by the latch valve 168, along with a secondary indicator window 443' with which the secondary indicia 423 of the pinion gear 430 are selectively aligned to thereby provide a fine indication of the regulation speed being provided by the latch valve 168. While each of the illustrated indicators is provided in the form of a window 443, 443' it is also contemplated that another form of indicator may be utilized, such as a demarcation (e.g., a line or arrow) that selectively aligns with the primary indicia 453 or the secondary indicia 423. The illustrated cover plate 442 also includes an aperture 447 through which the pinion gear post 436 extends.

The housing 440 may include fastener apertures 449 through which fasteners 409 may extend to secure the housing 440 to the closer body 110 such that the housing 440 blocks outward movement of the lead nut 410 beyond its terminal operating position. It is also contemplated that the housing 440 may be secured to the closer body 110 in another manner, such as via adhesives. Moreover, while the illustrated housing 440 is provided on the surface of the closer body 110, it is also contemplated that the mounting location 490 may include a recess operable to receive the housing 440 such that the cover plate 442 is substantially flush with the outer surface of the closer body 110.

The indicator plate 450 includes a plurality of teeth 452 operable to engage the at least one tooth 432 of the pinion gear 430, and a front side of the indicator plate 450 includes a plurality of primary indicia 453. In the illustrated form, the primary indicia 453 are offset from one another by a distance corresponding to the distance that the indicator plate 450 shifts in response to a full rotation of the pinion gear 430, and include a first indicium 453*a* relating to a first regulation speed of the valve 168, a second indicium 453*b* relating to a second regulation speed of the valve 168, and a third indicium 453*c* relating to a third regulation speed of the valve 168. In the illustrated form, the first through third indicia 453*a*, 453*b*, 453*c* are provided in the form of numbers. More particularly, the first indicium 453*a* includes a “1” to indicate that the valve 168 has been provided with one full turn from its home position to provide a low regulation speed, the second indicium 453*b* includes a “2” to indicate that the valve 168 has been provided with two full turns from its home position to provide medium regulation speed, and the third indicium includes a “3” to indicate that the valve 168 has been provided with three full turns from its home position to provide high regulation speed. It is also contemplated that one or more of the indicia 453 may include additional or alternative forms of indicia, such as colors, symbols, and/or letters.

Figure 15:
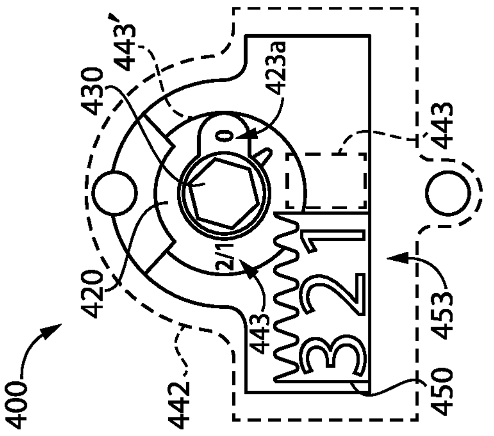

With additional reference to FIG. 15, the closer 100 may begin an operation with the valve 168 in its home or fully advanced position. In the illustrated embodiment, the primary indicator window 443 is not aligned with a portion of the indicator plate 450 in this home position, thereby indicating to the user that the valve 168 is in its home or fully advanced position. It is also contemplated that when the valve 168 is in its home position, the primary indicator window 443 may be aligned with a blank space on the indicator plate, or an indicium (e.g., the number zero) indicating that the adjustment screw 420 has not been rotated from its home position. In the home position, the secondary indicator window 443' may be aligned with the full-turn secondary indicium 423*a* to thereby provide a further indication that the adjustment screw 420 has not been rotated from its home position. From its home position, the adjustment screw 420 may be rotated in the valve-opening direction. As the adjustment screw 420 rotates from its home position, the at least one pinion tooth 432 engages one or more rack teeth 452 of the indicator plate 450 to thereby shift the indicator plate 450 to a first indicating position.

Figure 16:
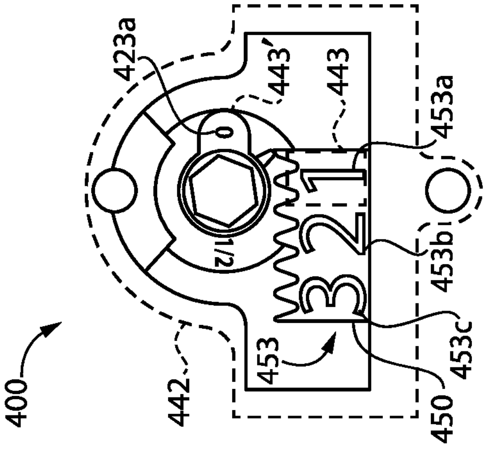

With additional reference to FIG. 16, illustrated therein is the indicator mechanism 400 after one full turn of the lead screw 420 and pinion 430. In this state, the indicator plate 450 has been shifted to its first indicating position, in which the first primary indicium 453*a* is aligned with the primary indicator window 443. Additionally, the first secondary indicium 423*a* is aligned with the secondary indicator window 443' to thereby indicate that the lead screw 420 has been rotated by an integer number of turns from its home position. Thus, the primary indicia 433 provide an indication regarding the number of full turns of the lead screw 420, while the secondary indicia 423 provide an indication regarding the absence of a fractional turn of the lead screw 420.

Figure 17:
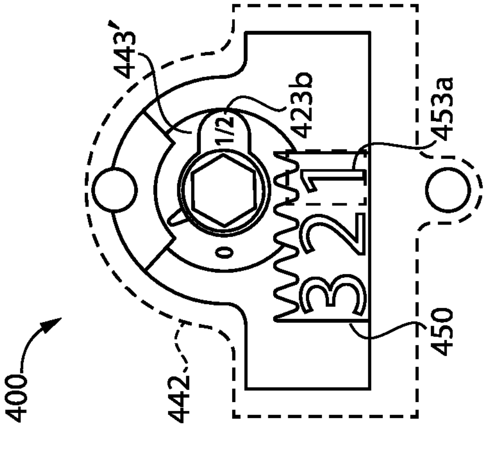
FIGS. 15-17 illustrate the indicator mechanism illustrated in FIG. 13 during various operating states.

With additional reference to FIG. 17, illustrated therein is the indicator mechanism 400 following an additional half turn of the lead screw 420 and pinion 430. While such a rotation modulates the position of the lead nut 410 (and thus the regulation speed provided by the valve 168), in the illustrated embodiment, such an additional half-turn does not drive the indicator plate 450 to a new position due to the fact that the pinion tooth 432 does not engage the rack teeth 452 during this half-turn. However, the presence of the additional half-turn is indicated by the secondary indicia 423. More particularly, the second secondary indicium 423*b* is aligned with the secondary indicator window 443', thereby indicating the presence of the additional half-turn. Thus, the primary indicia 433 provide an indication regarding the number of full turns of the lead screw 420, while the secondary indicia 423 provide an indication regarding the fractional half-turn of the lead screw 420.

As will be appreciated, continued rotation of the lead screw 420 and the pinion 430 from the position illustrated in FIG. 17 will cause the appropriate indicia 423, 453 to align with the corresponding indicator window 443, 443'. For example, when the lead screw 420 has been rotated by two and a half turns from its home position, the second primary indicium 453*b* will align with the primary indicator window 443, and the second secondary indicium 423*b* will align with the secondary indicator window 443'. Rotation of the lead screw 420 that would otherwise drive the lead nut 410 beyond its terminal operating position may be prevented by engagement of the splines 416 with the housing 440. Additionally or alternatively, rotation of the lead screw 420 that would otherwise drive the lead nut 410 beyond its terminal operating position may be prevented by engagement of the indicator plate 450 with the housing 440. In either case, the indicator mechanism 400 may aid in ensuring that the lead nut 410 does not withdraw beyond its terminal operating position, as such withdrawal may result in leaking of hydraulic fluid.

While the secondary indicia 423 have been described in connection with the indicator mechanism 400 illustrated in FIGS. 13-17, it should be appreciated that similar secondary indicia may be incorporated into the indicator mechanism 200 illustrated in FIGS. 5-9 and/or the indicator mechanism 300 illustrated in FIGS. 10-12. In the indicator mechanism 200, for example, one or more secondary indicia may be provided on the head 214 of the adjustment screw and selectively align with a secondary indicator (e.g., a window or arrow) of the cover plate 230. Similarly, in the indicator mechanism 300, one or more secondary indicia may be provided on the adjustment screw 310 and/or the pinion gear 330, and may selectively align with a secondary indicator (e.g., a window or arrow) of the cover plate 342.

While not specifically illustrated in FIGS. 13-17, it should be appreciated that the indicator mechanism 400 may include a movement resistance mechanism along the lines of that described above with reference to FIG. 9. For example, such a movement resistance mechanism may be configured to resist shifting of the indicator plate 450.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A hydraulic door operator, comprising:
- a body;
- a hydraulic regulation valve mounted to the body and operable to adjust an operating characteristic of the hydraulic door operator, the hydraulic regulation valve including an adjustment screw having a variable screw position;
- a visual indicator mechanism engaged with the hydraulic regulation valve and configured to provide a visual indication relating to a level of regulation provided by the hydraulic regulation valve, the visual indication varying according to the variable screw position; and
- a Geneva drive mechanism configured to rotate an indicator wheel through a predetermined angle in response to a 360° rotation of the adjustment screw, the Geneva drive mechanism comprising a dead-stop configured to limit rotation of the adjustment screw to a predetermined rotational range.

2. The hydraulic door operator of claim 1, wherein the visual indicator mechanism comprises:
- a first component movable relative to the body; and
- a second component;
- wherein one of the first component or the second component comprises a plurality of indicia, each of the indicia relating to a corresponding regulation level of the hydraulic regulation valve;
- wherein the other of the first component or the second component comprises an indicator operable to selectively align with each of the plurality of indicia; and
- wherein the first component is configured to move relative to the second component in response to rotation of the adjustment screw.

3. The hydraulic door operator of claim 2, wherein the Geneva drive mechanism is operable to move the first component relative to the second component in response to rotation of the adjustment screw.

4. The hydraulic door operator of claim 2, wherein the second component has a fixed position relative to the body.

5. The hydraulic door operator of claim 2, wherein the indicator comprises a window through which an aligned indicium of the plurality of indicia is visible.

6. The hydraulic door operator of claim 1, wherein the visual indicator mechanism includes a plurality of primary indicia and at least one secondary indicium;
- wherein the plurality of primary indicia are configured to provide a first indication regarding full turns of the adjustment screw; and
- wherein the at least one secondary indicium is configured to provide a second indication regarding a fractional turn of the adjustment screw.

7. The hydraulic door operator of claim 1, wherein the dead-stop is configured to limit rotation of the adjustment screw to the predetermined rotational range by preventing movement of the adjustment screw beyond a terminal operating position.

8. A door operator, comprising:
- a body;
- an adjustment screw rotatably mounted to the body, wherein an operating characteristic of the door operator varies according to a screw position of the adjustment screw;
- a visual indicator mechanism mounted to the body and configured to provide a visual indication relating to the screw position, wherein the visual indicator mechanism comprises an indicator wheel; and
- a Geneva drive mechanism comprising the adjustment screw and the indicator wheel, wherein the Geneva drive mechanism is configured to rotate the indicator wheel through a predetermined angle in response to a 360° rotation of the adjustment screw; and
- wherein the Geneva drive mechanism further comprises a dead-stop configured to prevent rotation of the adjustment screw beyond a terminal operating position.

9. The door operator of claim 8, wherein the predetermined angle is between 85° and 95°.

10. The door operator of claim 8, wherein the Geneva drive mechanism is configured to rotate the indicator wheel during one portion of the 360° rotation of the adjustment screw, and to not rotate the indicator wheel during another portion of the 360° rotation.

11. The door operator of claim 8, further comprising a hydraulic regulation valve comprising the adjustment screw.

12. A method, comprising:
- in response to a rotation of an adjustment screw of a door operator, moving a valve of the door operator to thereby alter an operating characteristic of the door operator;
- in response to the rotation of the adjustment screw, causing a Geneva drive mechanism to move a first indicator component to align with a second indicator component to thereby provide a visual indication relating to the operating characteristic of the door operator; and
- engaging a dead-stop of the Geneva drive mechanism to prevent rotation of the adjustment screw beyond a terminal operating position.

13. The method of claim 12, wherein the rotation of the adjustment screw comprises a first rotational movement and a second rotational movement; and
- wherein moving the first indicator component to align with the second indicator component comprises:
  - moving the first indicator component during the first rotational movement; and
  - maintaining a position of the first indicator component during the second rotational movement.

14. The method of claim 12, wherein one of the first indicator component or the second indicator component comprises an indicium; and wherein the other of the first indicator component or the second indicator component comprises an indicator.

15. The method of claim 12, wherein one of the first indicator component or the second indicator component comprises an alphanumeric character.

* * * * *